(12) United States Patent
Cheng et al.

(10) Patent No.: US 6,980,412 B2
(45) Date of Patent: Dec. 27, 2005

(54) VARIABLE TUNABLE RANGE MEMS CAPACITOR

(75) Inventors: Peng Cheng, Campbell, CA (US); Qing Ma, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/992,796

(22) Filed: Nov. 5, 2001

(65) Prior Publication Data

US 2002/0074621 A1 Jun. 20, 2002

Related U.S. Application Data

(62) Division of application No. 09/491,560, filed on Jan. 26, 2000, now Pat. No. 6,355,534.

(51) Int. Cl.[7] .............................. H01G 5/00; H01G 7/00
(52) U.S. Cl. ....................................... 361/277; 257/602
(58) Field of Search ........................ 257/532, 595–602; 361/277, 787, 292, 278, 281, 287, 290, 300, 361/271, 291, 298.1

(56) References Cited

U.S. PATENT DOCUMENTS

| | | |
|---|---|---|
| 3,341,794 A | 9/1967 | Stedman |
| 3,648,340 A | 3/1972 | MacIver |
| 3,917,964 A | 11/1975 | Carlson |
| 3,993,939 A * | 11/1976 | Slavin et al. ................ 317/246 |
| 4,095,263 A * | 6/1978 | Johanson ................... 361/292 |
| 4,198,670 A * | 4/1980 | Mann ........................ 361/283 |
| 4,236,137 A | 11/1980 | Kurtz et al. |
| 4,674,319 A * | 6/1987 | Muller et al. ............... 73/24.01 |
| 4,697,159 A | 9/1987 | Sechi et al. |
| 5,185,690 A * | 2/1993 | Miller ....................... 361/321.2 |
| 5,526,172 A * | 6/1996 | Kanack ....................... 359/291 |
| 5,619,061 A | 4/1997 | Goldsmith |
| 5,963,788 A | 10/1999 | Barron et al. |
| 5,973,343 A * | 10/1999 | Takaishi ..................... 257/296 |
| 6,022,225 A * | 2/2000 | Chapin et al. ................. 439/73 |
| 6,215,644 B1 * | 4/2001 | Dhuler ....................... 361/280 |

FOREIGN PATENT DOCUMENTS

| | | |
|---|---|---|
| EP | 0637042 A2 * | 7/1994 |
| JP | 03083314 A * | 4/1991 |

OTHER PUBLICATIONS

Kevin F. Harsh et al, "Flip-Chip Assembly for Si-Based RF MEMS", IEEE, MEMS '99 Conference, 12th Intl. Conference, pp 273-278, Dec. 1999.

L. Fan et al., Universal MEMS Platforms for Passive RF Components: Suspended Inductors and Variable Capacitors, IEEE, Micro Electro Mechanical System, pp. 29-33, Dec. 1998.

J. Chiao et al., "MEMS Millimeterwave Components", IEEE MTT-S Digest, pp 463-466, May 1999.

(Continued)

*Primary Examiner*—Hoai Pham
*Assistant Examiner*—Dana Farahani
(74) *Attorney, Agent, or Firm*—Kathy J. Ortiz

(57) ABSTRACT

The invention relates to a variable capacitor and method of making it. The variable capacitor comprises a fixed charge plate disposed in a substrate, a movable charge plate disposed above the fixed charge plate, and a stiffener affixed to the movable charge plate. The movable charge plate may be patterned to form a movable actuator plate where the fixed charge plate is elevated above a fixed actuator plate.

10 Claims, 9 Drawing Sheets

OTHER PUBLICATIONS

H. Wu et al., "MEMS Designed for Tunable Capacitors", IEEE MTT-S Digest, pp 127-129, May 1998.

Y.B. Gianchandani et al. "A MEMS-First Fabrication Process for Integrating CMOS Circuits with Polysilicon Microstructures", IEEE, Micro Electro Mechanical Systems, pp 257-262, Dec. 1998.

Z. Lisa Zhang et al. "Submicron, Movable Gallium Arsenide Mechanical Sturctures and Actuators" IEEE Micro Electro Mechanical Systems, pp 72-77, Feb. 1992.

Kevin F. Harsh et al. "The Realization and Design Considerations of a Flip-Chip Integrated MEMS Tunable Capacitor" Proceedings of 12th Int'l Workshop on Micro Electro Mechanical Systems, MEMS, pp 108-118, Orlando, FL, vol. A80, No. 2, Jan. 1999, XP004192096, Sensors and Actuators A (Physical) Mar. 2000, Elsevier, Switzerland.

International Search Report, PCT/US 01/02202, Jan. 22, 2001.

* cited by examiner

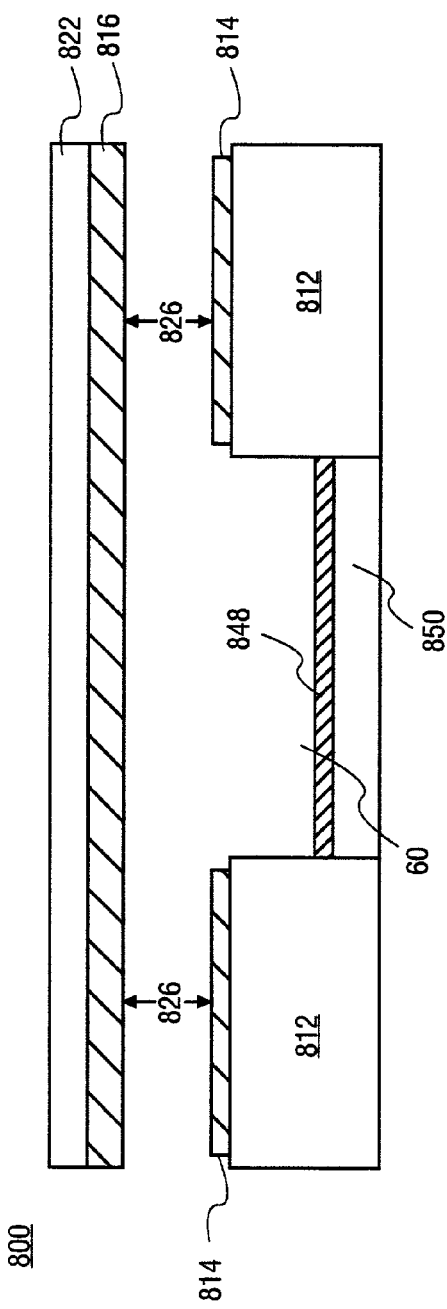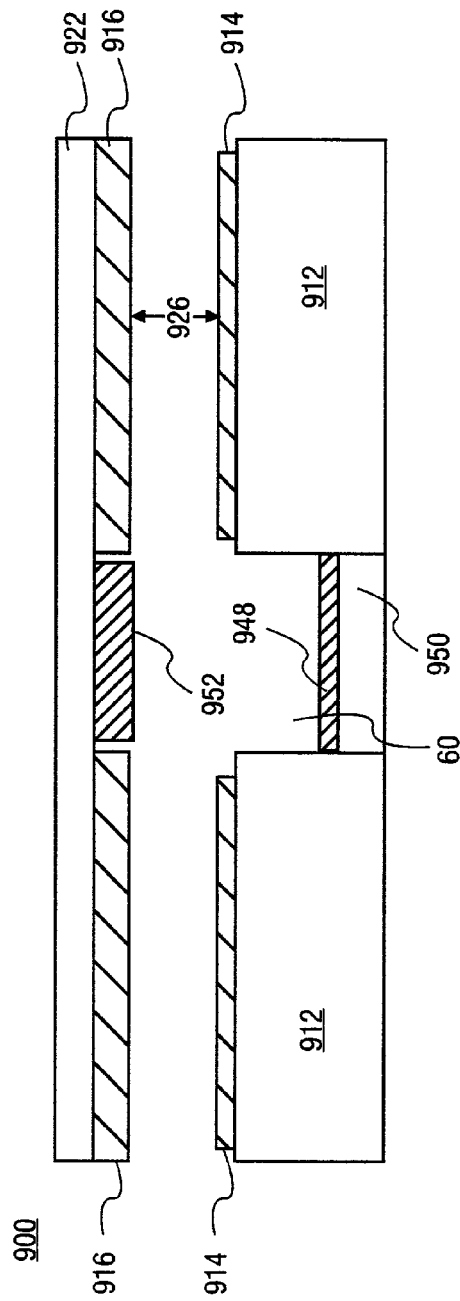

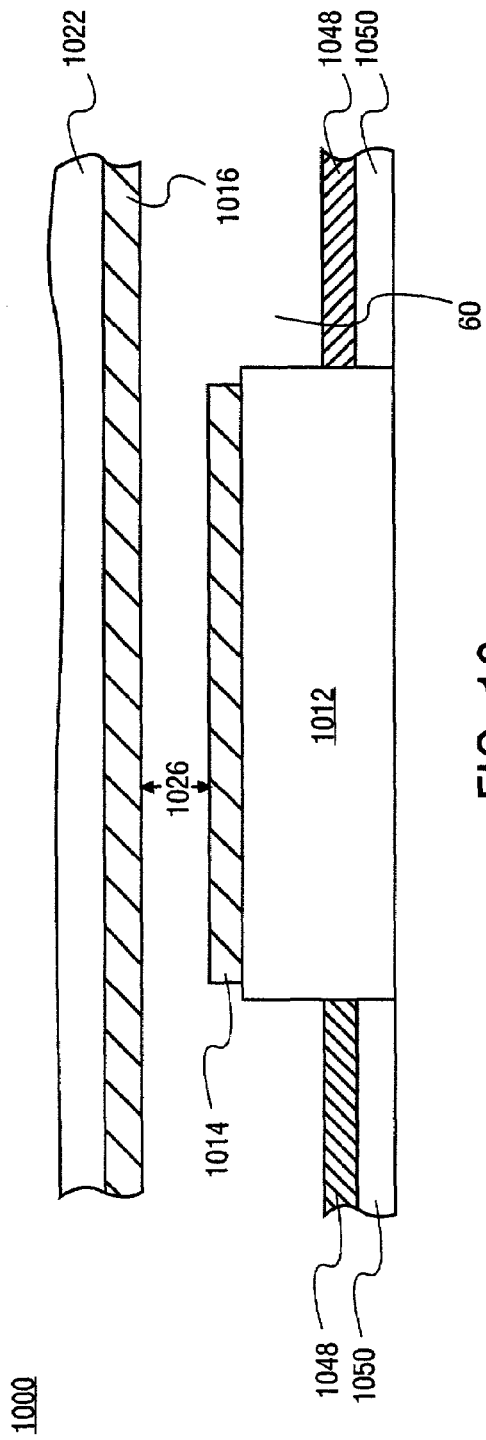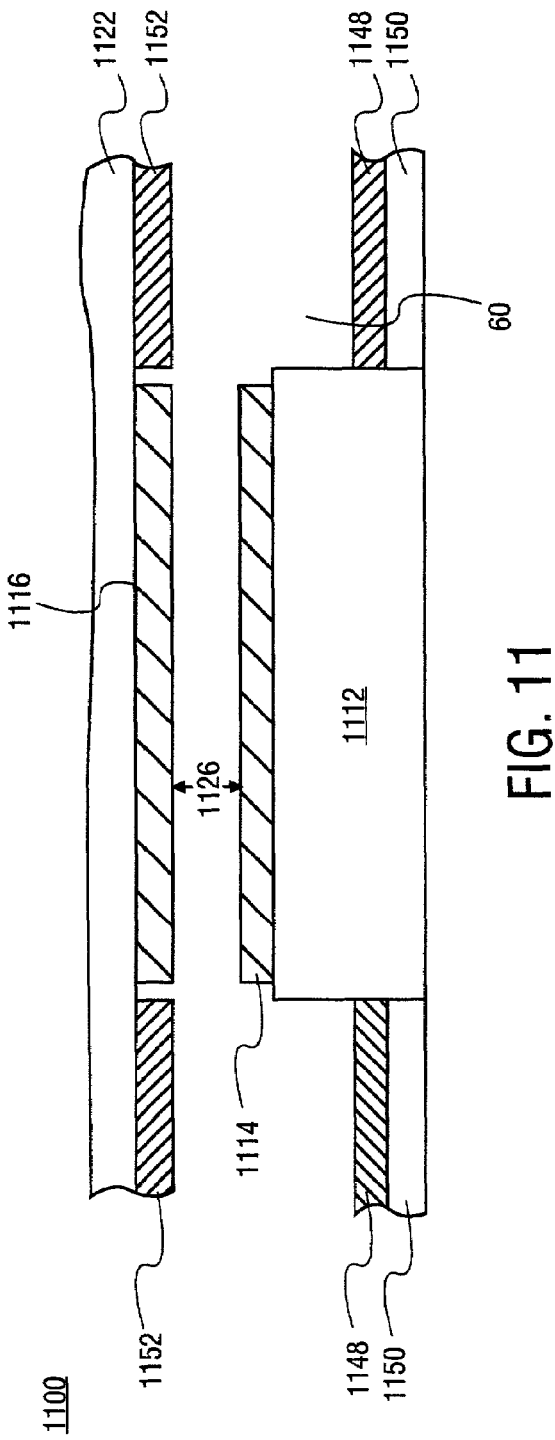

VARIABLE TUNABLE RANGE MEMS CAPACITOR

This a Divisional application of Ser. No. 09/491,560 filed Jan. 26, 2000, now U.S. Pat. No. 6,355,534.

BACKGROUND OF THE INVENTION

1. Field of the Invention

The present invention relates generally to microelectromechanical structure (MEMS) fabrication, and, more specifically, the present invention relates to the fabrication of a variable capacitor that is tunable over a wide range.

2. Description of Related Art

As microelectronic technology continues to experience miniaturization and, greater device flexibility, the need has arisen for variable capacitors that can have greater capability and reliability. Prior art on-chip variable capacitors are based on varactor diode technology that have a tuning range of less than about 25%. The varactor diode technology also has a low pull-in effect.

Additionally, prior art membrane capacitors have a capacitance tunable range that is limited due to the voltage exceeding the critical voltage (Vc) thereof. At Vc, the membrane collapses and the capacitor shorts out. Additionally, due to the suspension nature of the prior art capacitors, the center portion of the flexible membrane draws closer to the fixed electrode than the edge portions. This phenomenon creates a greater local capacitance at the center of the flexible membrane than at the edge portions of the flexible membrane where it is anchored.

Between capacitors, it is difficult to control capacitance change in any predictable way such as a linear or even a nonlinear functional correlation between the amount of applied direct current (DC) voltage and the resulting capacitance. Where the edge portions of the flexible membrane occupies a substantial capacitance surface area in relation to the center portion, it becomes difficult to achieve an appreciable range of tunable capacitance.

What is needed is a variable capacitor that overcomes the problems in the prior art.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. In the drawings, like structures will be provided with like reference designations. In order to show the structures of the present invention most clearly, the drawings included herein are diagrammatic representations of integrated circuit structures. Thus, the actual appearance of the fabricated structures, for example in a photomicrograph, may appear different while still incorporating the essential structures of the present invention. Moreover, the drawings show only the structures necessary to understand the present invention. Additional structures known in the art have not been included to maintain the clarity of the drawings. Understanding that these drawings depict only typical embodiments of the invention that are not necessarily drawn to scale and are not therefore to be considered to be limiting of its scope, the invention will be described and explained with additional specificity and detail through the use of the accompanying drawings in which:

FIG. 8 is an elevational cross-section view of another embodiment of the variable capacitor;

FIG. 9 is an elevational cross-section view of an alternative embodiment of the variable capacitor depicted in FIG. 8;

FIG. 10 is an elevational cross-section view of another embodiment of the variable capacitor;

FIG. 11 is an elevational cross-section view of an alternative embodiment of the variable capacitor depicted in FIG. 10.

DETAILED DESCRIPTION OF THE INVENTION

The present invention relates to a variable capacitor that is a micro-electromechanical system (MEMS). The variable capacitor overcomes problems inherent in the prior art by stiffening a movable charge plate and by making variable capacitance a more linear function of the actuation force applied, and by accomplishing a much larger tuning range.

A first aspect of the present invention relates to the prevention of collapse of the capacitor. Thereby, the tunable range is increased over the prior art by a factor of at least two, and preferably by a factor of at least four and higher.

Figure 1:
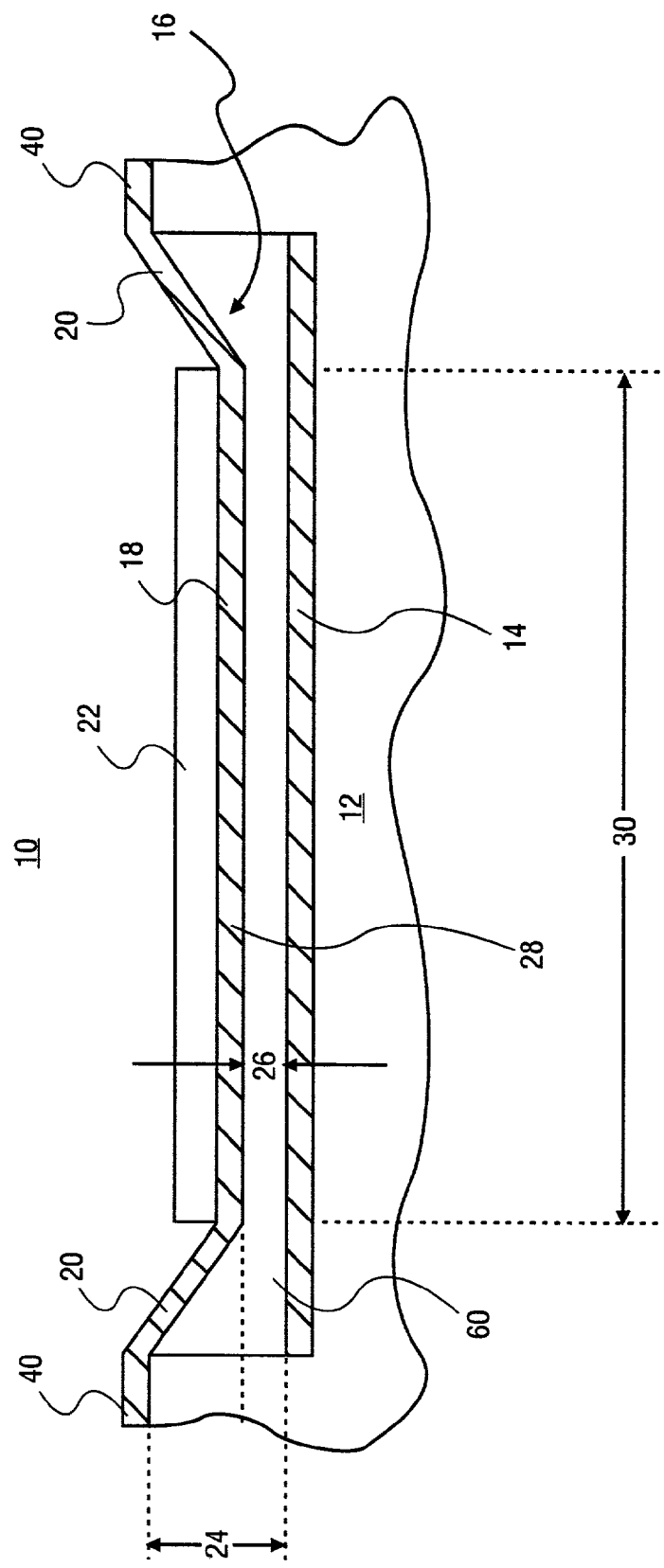
FIG. 1 is an elevational cross-section view of a variable capacitor according to the present invention.

FIG. 1 is an elevational cross-section view of the inventive variable capacitor that is designated by the reference numeral 10. FIG. 1 illustrates a substrate 12 in which a fixed charge plate 14 is disposed. A movable charge plate 16 is disposed above fixed charge plate 14. Movable charge plate 16 may be characterized by a planar portion 18, a suspension portion 20, and a terminal portion 40. Affixed to planar portion 18 of movable charge plate 16 is a stiffener 22. Stiffener 22 may occupy the same footprint as planar portion 18 of movable charge plate 16.

A first separation distance 24 is observed as the original separation distance between fixed charge plate 14 and planar portion 18 before an actuation force is applied. Similarly, a second separation distance 26 is observed between planar portion 18 of movable charge plate 16 and fixed charge plate 14 as the tunable capacitor separation distance at a given applied actuation force.

Stiffener 22 may be made of any material that causes planar portion 18 of movable charge plate 16 to resist bending. Preferably, stiffener 22 is made of silicon nitride, $Si_xN_y$, where x and y have values that make up both stoichiometric and solid solution combinations. Stiffener 22 may also be made of oxides such as silica, titania, alumina, ceria, thoria, and other oxides that make up both stoichiometric and solid solution combinations. Additionally, stiffener 22 may be made of any material, preferably dielectric, that allows the inventive structure to achieve a tunable range greater than about 30%, preferably greater than about 50%, and more preferably greater than about 100%.

Figure 2:
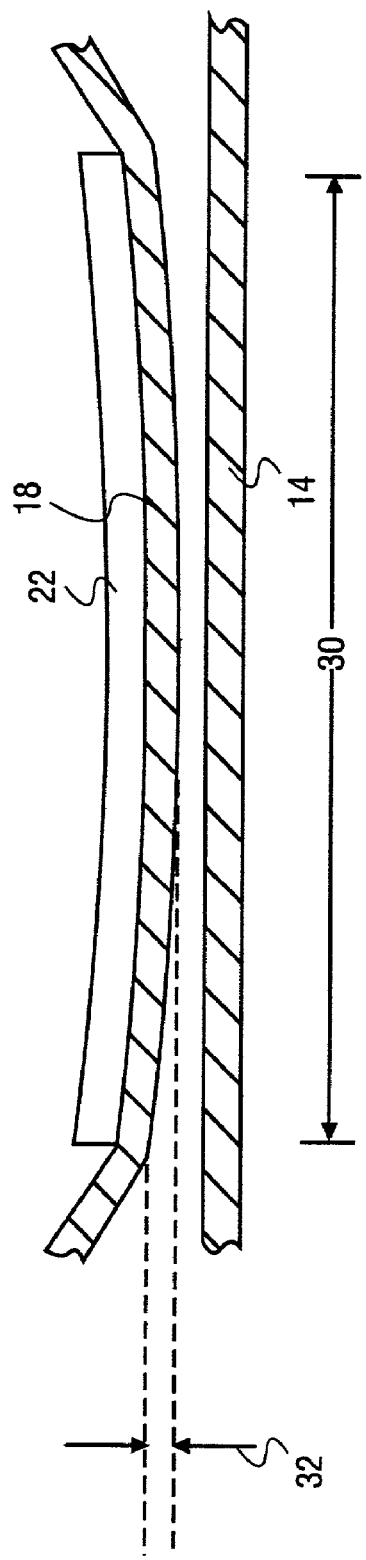
FIG. 2 is an exaggerated elevational cross-section view the variable capacitor to illustrate relative warping of a MEMS device.

Second separation distance 26 is observed to be substantially constant. By "substantially constant," it is meant that warping of planar portion 18 of movable charge plate 16 is minimized. Relative warping is defined as a relative measure of deflection of any point along the charge surface 28 of planar portion 18 in vertical relation to any other point thereon, divided by the length 30 of planar portion. FIG. 2 is an exaggerated detail illustration of relative warping wherein the deflection difference 32, can be relatively quantified by dividing by length 30. Relative warping in the present invention may be in a range from about 30% to about 0.1%, preferably from about 10% to about 0.5% and most preferably from about 2% to about 1%.

Referring again to FIG. 1, first separation distance 24 is the measurement from terminal portion 40 of movable charge plate 16 to down to fixed charge plate 14. Suspension portion 20 of movable charge plate 16 is separated from fixed charge plate 14 over a variable distance that is at a maximum at first separation distance 24 and at a minimum at second separation distance. Consequently, removing material in this portion preferably reduces capacitance for suspension portion 20.

Figure 3:
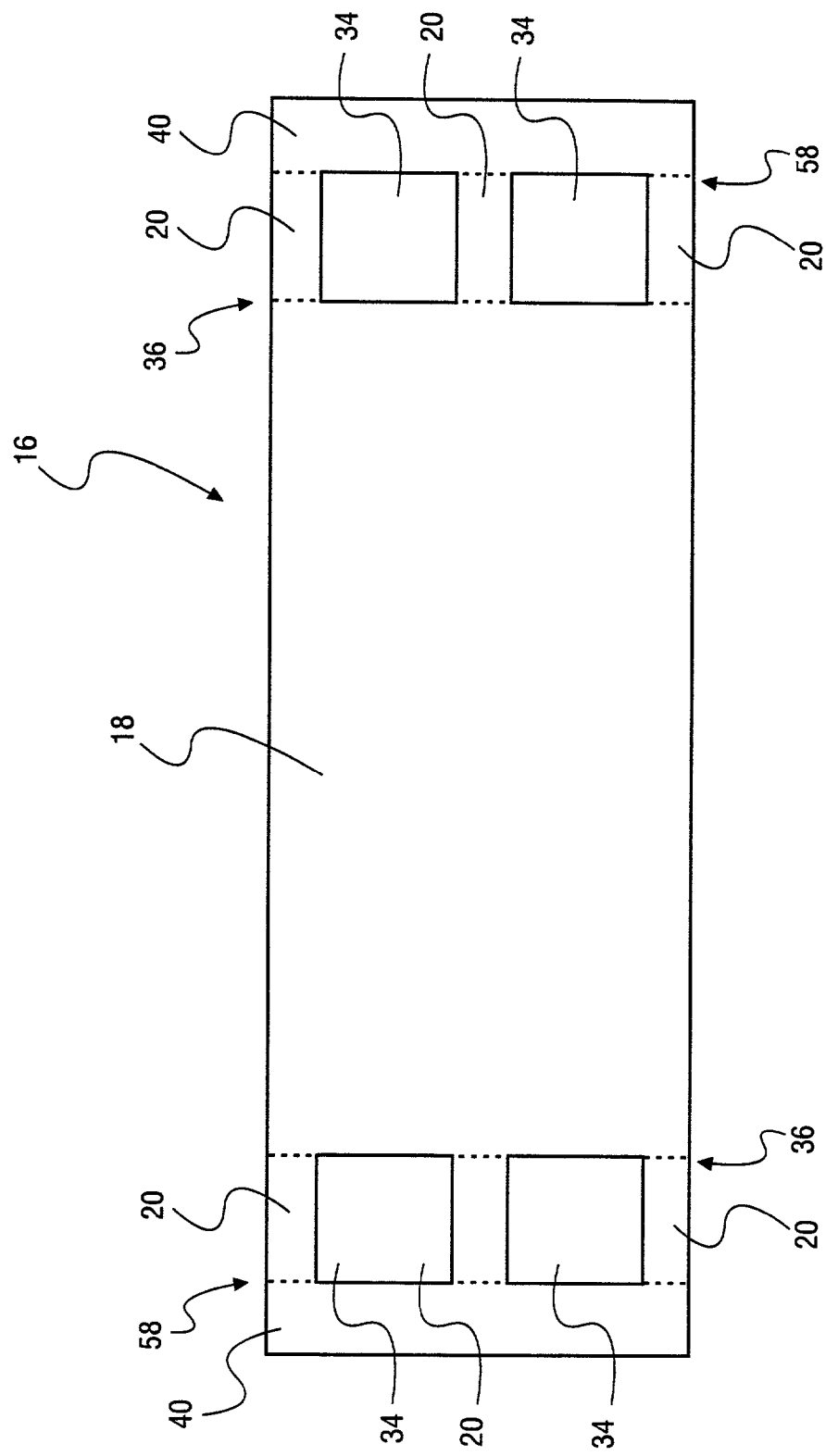
FIG. 3 is a top cut-away view of the variable capacitor depicted in FIG. 1.

FIG. 3 is a top view of variable capacitor 10 that further illustrates the present invention. Stiffener 22 has been removed to further illustrate movable charge plate 16. Movable charge plate 16 is seen as comprising planar portion 18 and suspension portion 20 that meet an angle at a bend depicted by the dashed line 36, and terminal portion 40. Terminal portion 40 and suspension portion 20 also meet at an angle at a bend depicted by the dashed line 58.

FIG. 3 illustrates that suspension portion 20 may contain through holes 34 to form a broken surface suspension of planar portion 18. The broken surface of suspension portion 20 of movable charge plate 16 reduces capacitance surface area for that section of movable charge plate 16 by reducing the amount of charge surface area that is present at the variable first separation distance 24. Thereby the broken surface of suspension portion 20 allows for better control of the variable capacitor quality of the present invention. Additionally, because there is less material that must bend in suspension portion 20 when it has a broken surface suspension, movable charge plate 16 is more pliable and therefore more easily tunable. It is understood that suspension portion 20 may also be solid. Where suspension portion 20 has a broken surface, fixed charge plate 14 has a first surface area and movable charge plate 16 has a second surface area that is smaller than the first surface area.

In a preferred embodiment, the capacitor according to the present invention has a movable charge plate that is divided into a solid surface charge plate portion and a broken surface suspension.

Figure 4:
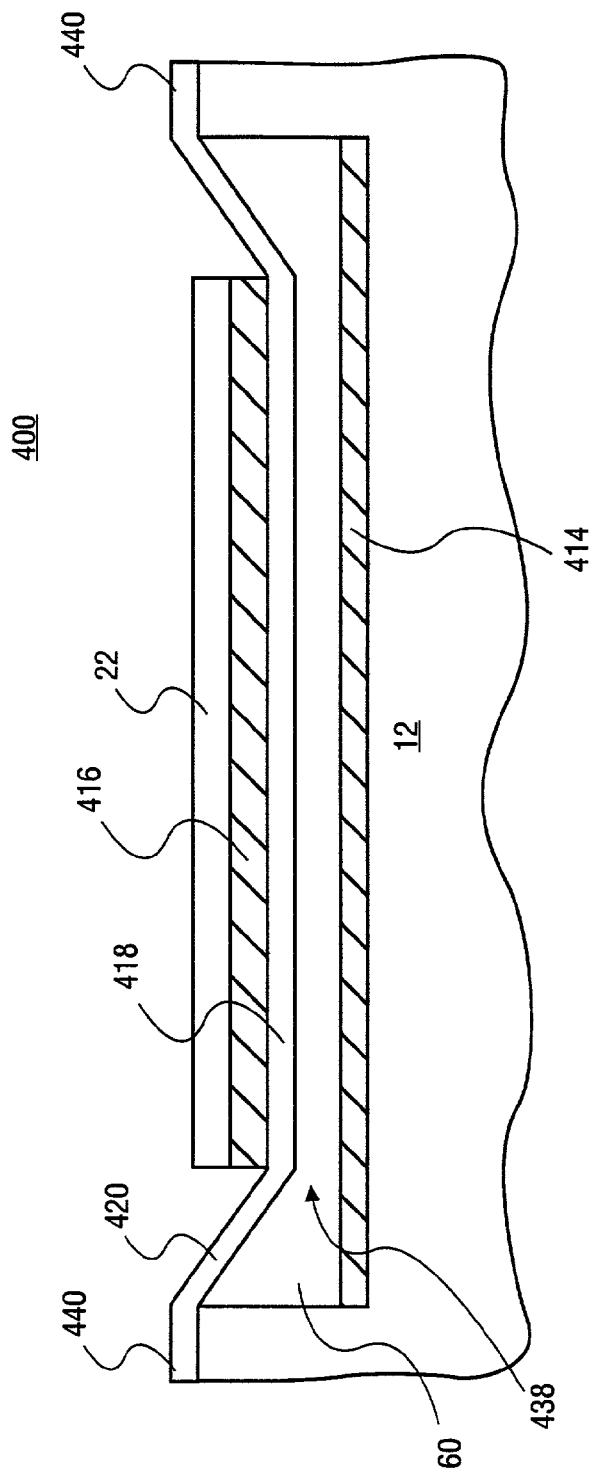
FIG. 4 is an elevational cross-section view of another embodiment of the variable capacitor.

FIG. 4 is an elevational cross-section view of another variable capacitor 400 that illustrates another embodiment of the present invention. FIG. 4 illustrates a flexible dielectric material 438 that has a movable charge plate 416 disposed thereon and that is suspended above a fixed charge plate 414. It is noted that movable charge plate 416 cannot make electrical contact with fixed charge plate 414 because flexible dielectric material 438 is interposed therebetween.

In this embodiment, flexible dielectric material 438 is divided into a planar subsection 418. a suspension subsection 420, and a terminal subsection 440. A stiffener 22 is disposed upon flexible dielectric material 438. Stiffener 22 has a footprint that may be substantially the same as movable charge plate 416 as well as planar subsection 418. Movable charge plate 416 is interposed between stiffener 22 and planar subsection 418. Although stiffener 22 is illustrated as entirely cloaking movable charge plate 416 from a top-down view in FIG. 4, it is understood that stiffener 22 may have a footprint that is larger, the same as, or smaller than movable charge plate 416. Where stiffener 22 is larger, it may be larger by a factor range from about 1.01 to about 2, preferably from about 1.1 to about 1.5.

In the process of forming at least one through hole 34 (not pictured in FIG. 4) in the flexible dielectric below the movable charge plate, the at least one through hole 34 has an area, relative to the total area of flexible dielectric 438, in a range from about 1% to about 50%, preferably from about 10% to about 40%.

Figure 5:
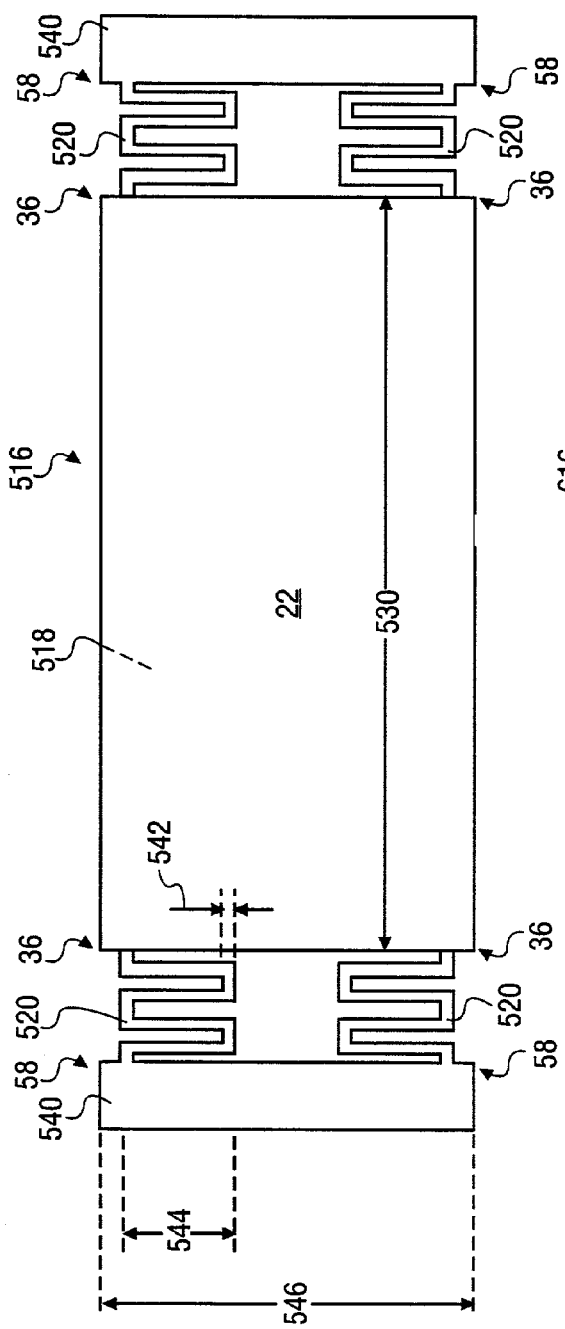
FIG. 5 is a top view of an alternative embodiment of the variable capacitor depicted in FIG. 1.

FIG. 5 is another embodiment of the present invention. In this embodiment, a stiffener 22 is superimposed over a movable charge plate 516. In this embodiment, stiffener 22 obscures the planar portion 518 of movable charge plate 516. In this embodiment, the suspension portion 520 of movable charge plate 516 forms a spring in the shape of an undulating suspension between planar portion 518 and the terminal portion 540 of movable charge plate 516. By this embodiment, greater flexibility may be achieved for the actuation of planar portion 518 of movable charge plate 516. FIG. 5 illustrates suspension portion 520 with "W" and "M" shapes.

Figure 6:
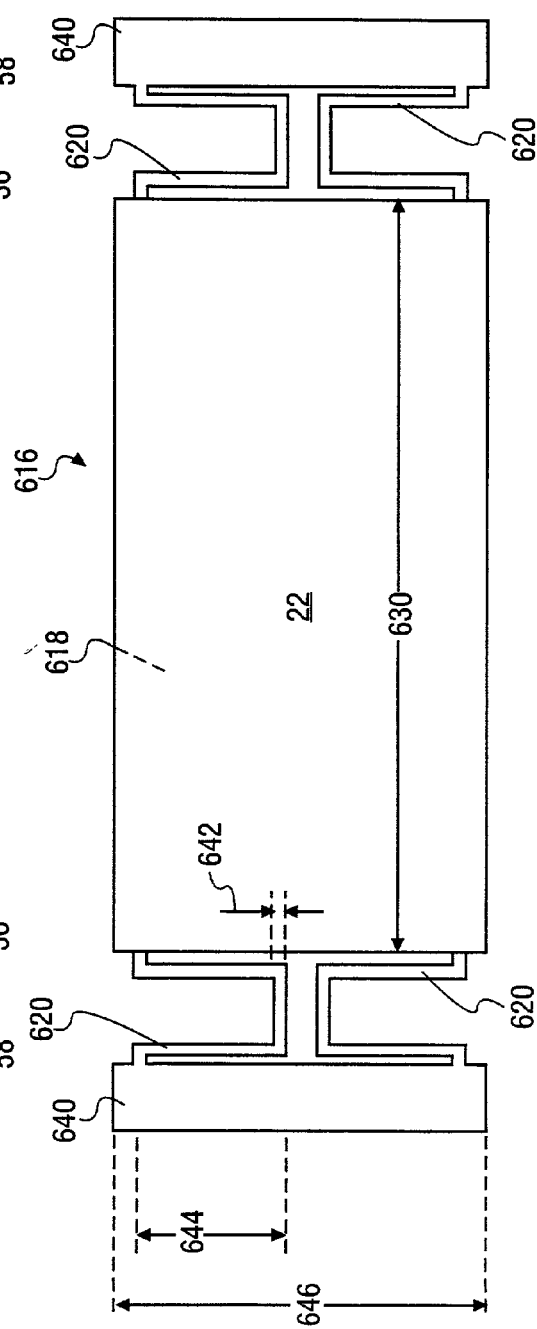
FIG. 6 is a top view of an alternative embodiment of the variable capacitor depicted in FIG. 1.
Figure 7:
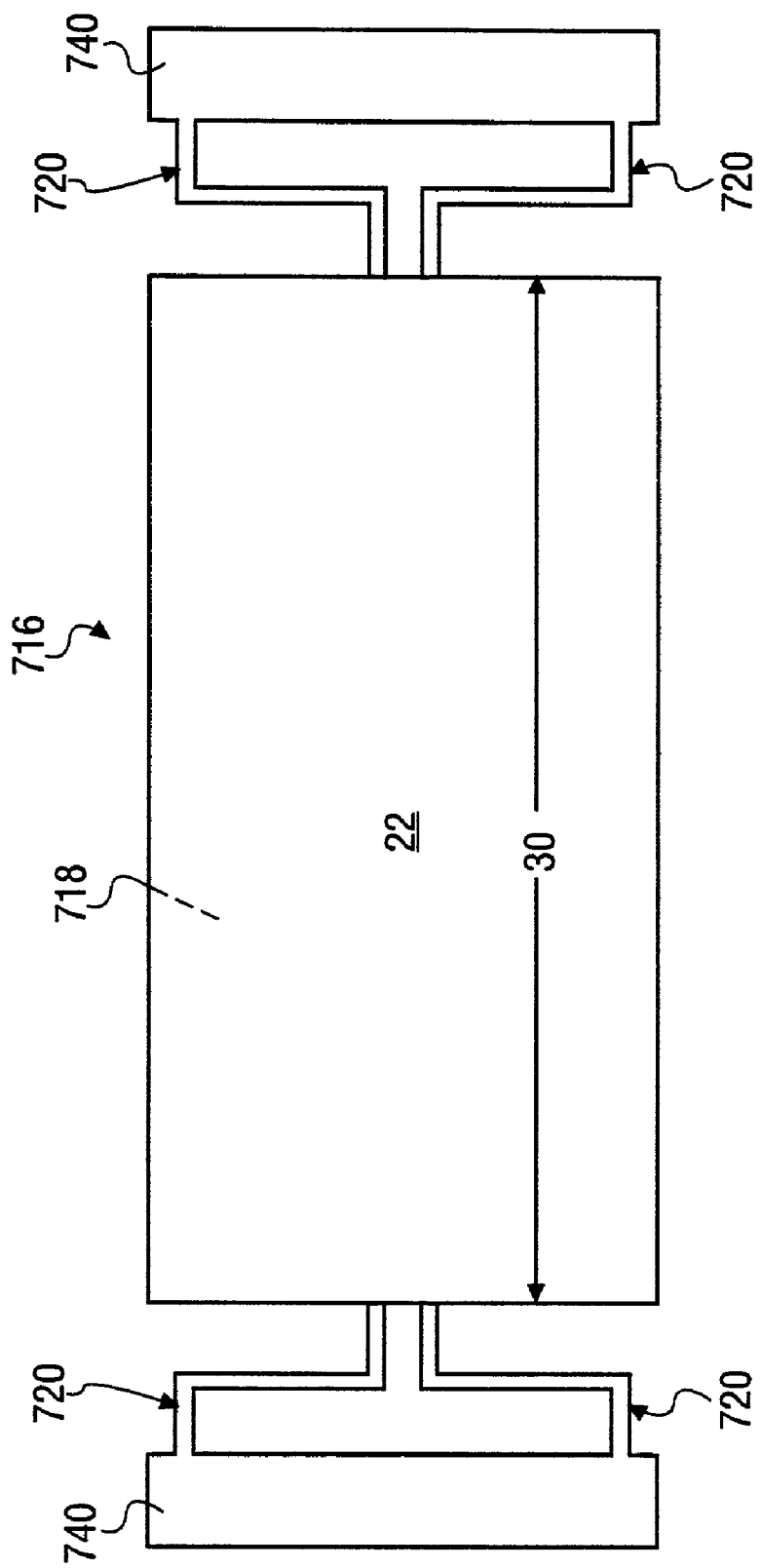
FIG. 7 is a top view of an alternative embodiment of the variable capacitor depicted in FIG. 1.

Although these shapes are one preferred embodiment, simpler or more complex shapes may be achieved. One example of a simpler shape is illustrated in FIG. 6. In FIG. 6, suspension 620 has both "U" shaped and an inverted horseshoe shaped undulating connections between planar portion 618 and the terminal portion 640 of movable charge plate 616. Another example of a simpler shape is illustrated in FIG. 7. In FIG. 7, suspension portion 720 has both "S" and backward "S" shapes that undulate between planar portion 718 and the terminal portion 740 of movable charge plate 716.

Although the undulating suspensions 520, 620, and 720 depicted in FIGS. 5, 6. and 7 are presented as portions of movable charge plates 516, 716, and 716, respectively, it is understood that the undulating suspensions 520, 620, and 720 may also be integral portions of flexible dielectric materials. The integral portions of flexible dielectric materials may be for structures depicted in FIG. 4.

In an alternative embodiment, the undulating configuration that constitutes the suspension portion of the flexible dielectric, may be a continuous undulating structure that extends across the planar portion of the movable charge plate to create a multiple channel open configuration. Accordingly, where FIG. 4 may illustrate a continuous undulating structure, it may begin at one terminal portion 440, continue as one suspension portion 420, continue as planar portion 418, and finish as the other suspension portion 420 and terminal portion 440, respectively.

Different degrees of flexibility are achieved by the particular material used, whether charge plate material or flexible dielectric material, and by the dimensions of the undulating structures. For example, suspension portion 520 of movable charge plate 516 has a thickness 542 and amplitude 544 that may be related to the length 530 and/or the width 546 of movable charge plate 516. Similarly, the suspension portion 620 of movable charge plate 616 has a thickness 642 and amplitude 644 that may be related to the length 630 and/or the width 646 of movable charge plate 616.

FIG. 8 illustrates another embodiment of the present invention in which the functions of capacitance and electrostatic actuation are separated. Fixed charge plates 814 may be elevated upon the substrate 812 above an actuator plate 848. Actuator plate 848 is disposed upon a lower substrate 850. The elevation of fixed charge plates 814 may be negligible or omitted to achieve a structure where fixed charge plates 814 and fixed actuator plate 848 are at substantially the same level. For this alternative embodiment, substrates 812 and 850 may be the same level and fashioned from the same material layer in a single process step.

The movable charge plate 816 is affixed to a stiffener 822. Together, movable charge plate 816 and stiffener 822 are actuated by actuator plate 848 to establish a preferred separation distance 826 for a desired capacitance. Actuator plate 848 uses electromotive force to reposition movable charge plate 816 to a desired separation distance 826.

FIG. 9 illustrates another embodiment of the present invention similar to the embodiment depicted in FIG. 8, with the addition that there is a plurality of movable charge plates 916 that are isolated from a movable actuator plate 952. According to this embodiment, the establishment of a preferred capacitance may be carried out where the electromotive force applied between the fixed actuator plate 948 and the movable actuator plates 952. This actuation scheme has a diminished effect, if any, upon the capacitance that is established between the fixed charge plates 914 and movable charge plates 916. Accordingly, the desired capacitance established may be more directly related to the separation distance 926.

FIG. 10 illustrates yet another embodiment of the present invention in which the functions of capacitance and electrostatic actuation are separated. A fixed charge plate 1014 may be elevated upon the substrate 1012 above an actuator plate 1048. Actuator plate 1048 is disposed upon a lower substrate 1050. The elevation of fixed charge plate 1014 may be negligible or omitted to achieve a structure where fixed charge plate 1014 and fixed actuator plate 1048 are at substantially the same level. For this alternative embodiment, substrates 1012 and 1050 may be the same level and fashioned from the same material layer in a single process step.

The movable charge plate 1016 is affixed to a stiffener 1022. Together, movable charge plate 1016 and stiffener 1022 are actuated by actuator plate 1048 to establish a preferred separation distance 1026 for a desired capacitance. Actuator plate 1048 uses electromotive force to reposition movable charge plate 1016 to a desired separation distance 1026.

FIG. 11 illustrates another embodiment of the present invention similar to the embodiment depicted in FIG. 10, with the addition that the movable charge plate 1116 is isolated from movable actuator plates 1152. According to this embodiment, the establishment of a preferred capacitance may be carried out where the electromotive force applied between the fixed actuator plate 1148 and the movable actuator plate 1152. This actuation scheme has a diminished effect, if any, upon the capacitance that is established between the fixed charge plate 1114 and movable charge plate 1116. Accordingly, the desired capacitance established may be more directly related to the separation distance 1126.

In the embodiments set forth in FIGS. 8, 9, 10 and 11, it is understood that suspension of the movable charge plate may be carried out by the suspension portion embodiments as set forth in this disclosure. Additionally, other suspension schemes may be used for this embodiment of the invention.

In the forgoing embodiments, the suspension sections 20, 420, 520, 620, and 720 are examples of a means for suspending the movable charge plate. In the forgoing embodiments, the fixed charge plates 14, 414, 848, 948, 1048, and 1148 are examples of a means for moving the movable charge plate.

Figure 12:
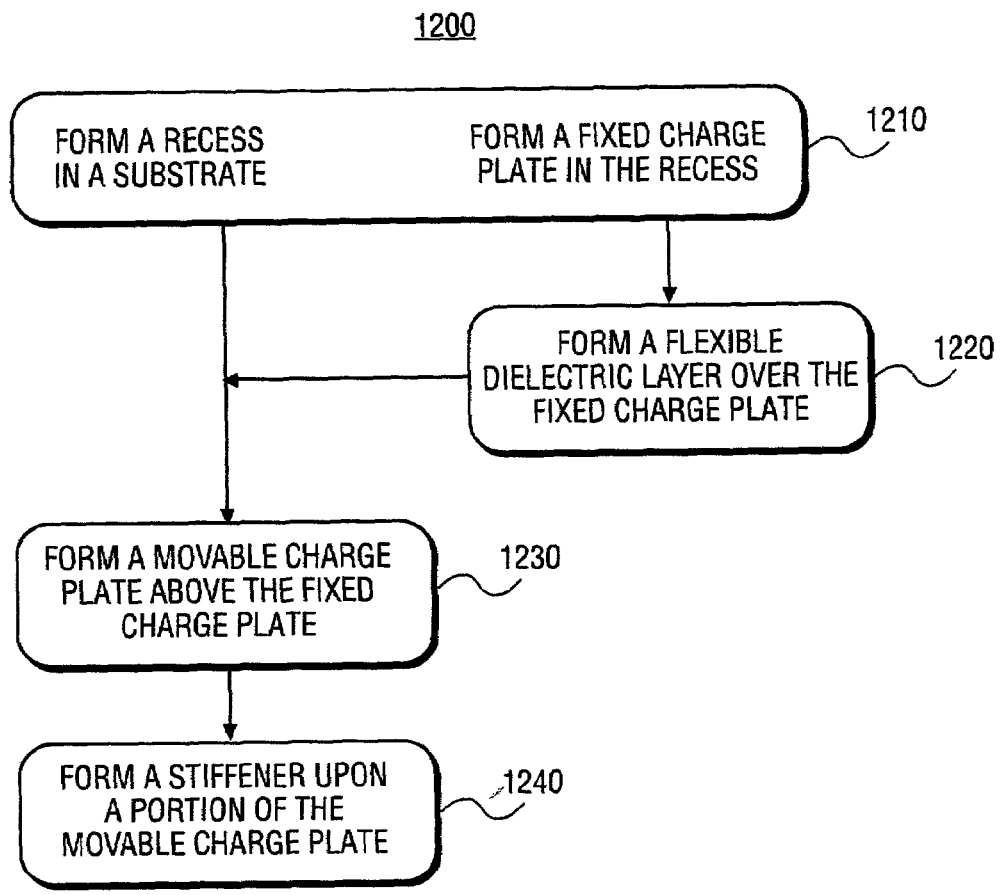
FIG. 12 is a process flow diagram that illustrates the inventive method.

The variable capacitor is made according to an inventive method 1200 that is illustrated in FIG. 12. A recess 60 is formed in substrate 12 as depicted in FIG. 1. Recess 60 may be formed of a single etch, or it may be part of a damascene structure. Fixed charge plate 14 is formed in recess 60 by deposition such as chemical vapor deposition (CVD) or physical vapor deposition (PVD). The method illustrated in FIG. 12 demonstrates that formation of the recess and the fixed charge plate may be contemporaneous as depicted in flow block 1210. Movable charge plate 16 is formed above fixed charge plate 14 as depicted in process flow block 1230. Movable charge plate 16 is formed by a method such as filling recess 60 with a temporary material, depositing movable charge plate 16, and wet etching the temporary filler material that filled recess 60. Stiffener 22 is formed upon a portion of movable charge plate 16 as depicted in flow block 1240. Where patterning of at least a portion of movable charge plate 16 precedes removal of filler material in recess 60, patterning of multiple through-holes 34 or any one of the undulating suspension sections as disclosed herein, will facilitate removal of the filler material.

The variable capacitor 400 illustrated in FIG. 4 is formed in a manner similar to variable capacitor 10. Prior to formation of movable charge plate 16, flexible dielectric layer 438 is formed upon a filler material that is to be removed to form recess 60 as depicted in process flow block 1220. After flexible dielectric layer 438 is formed, patterning may precede or follow removal of the filler material disposed in recess 60. Where patterning of flexible dielectric layer 438 precedes removal of the filler material in recess 60, patterning of any one of the undulating suspension sections as disclosed herein, will facilitate removal of the filler material.

The variable capacitor 800 depicted in FIG. 8 is formed by forming lower substrate 850 in recess 60 and forming fixed actuator plate 848 upon lower substrate 850. Elevated substrate 812 is formed either by depositing or etching into a portion of recess 60. Fixed charge plate 814 is formed upon elevated substrate 812 and a filler material to be removed fills recess 60 during the formation of flexible dielectric layer (not pictured) according to embodiments set forth herein. Where fixed charge plate 814 and fixed actuator plate 848 are at the same height, they may be patterned from the same metal layer. Variable capacitor 900 is formed by a similar method with the added limitation that movable charge plates 916 are patterned to form movable actuator plate 952.

The variable capacitor 1000 depicted in FIG. 10 is formed by forming lower substrate 1050 in recess 60 and forming fixed actuator plate 1048 upon lower substrate 1050. Elevated substrate 1012 is formed either by depositing or etching into a portion of recess 60. Fixed charge plate 1014 is formed upon elevated substrate 1012 and a filler material to be removed fills recess 60 during the formation of flexible dielectric layer (not pictured) according to embodiments set forth herein. Where fixed charge plate 1014 and fixed actuator plate 1048 are at the same height, they may be patterned from the same metal layer. Variable capacitor 1100 is formed by a similar method with the added limitation that movable charge plate 1116 is patterned to form movable actuator plate 1152.

Distinct advantages exist for the present invention. One advantage is that a tunable range is achieved that was not achievable in the prior art. Because of the presence of a stiffener as disclosed herein, the critical gap between the movable charge plate and the fixed charge plate can be smaller than what was allowable in the prior art. Consequently, the tunable range of the variable capacitor may be more than 100%. As applied to wireless technology, by way of non-limiting example, the variable capacitor of the present invention may enable a wireless device to operate at multiple bands such as 900 MHz, 1.9 GHz, and 2.4 GHz. Thus, transceiver design may be changed to enable the same variable capacitor to be used for the various frequencies.

Another advantage is that the establishment and control over a preferred capacitance is more predictable and therefore more reliable. The presence of the stiffener and the broken surface suspension significantly reduces the capacitance that does not change near the terminal ends of variable capacitors of the prior art. Further, the separation of actuation and capacitance as disclosed herein allows for greater control.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A capacitor, comprising:
   a fixed charge plate disposed on a semiconductor substrate;
   a fixed actuator plate disposed upon the semiconductor substrate;
   a moveable charge plate disposed above the fixed charge plate, wherein the fixed charge plate has a first surface area and the movable charge plate has a second surface area that is smaller than the first surface area;
   a stiffener disposed on a center portion of the moveable charge plate; and
   a movable actuator plate disposed over the fixed actuator plate.

2. The capacitor according to claim 1, the movable charge plate further comprising:
   a first separation distance between the fixed charge plate and the stiffener, wherein the first separation distance is constant.

3. The capacitor according to claim 1, further comprising:
   a first separation distance between the fixed charge plate and the stiffener, wherein the first separation distance is constant; and
   a second separation distance between the fixed charge plate and portions of the movable charge plate, wherein the second separation distance is variable.

4. The capacitor according to claim 1, wherein the movable charge plate comprises a solid surface plate and a broken surface suspension.

5. The capacitor according to claim 1, wherein the movable charge plate comprises a solid surface plate and a broken surface suspension, and wherein the broken surface suspension has an undulating configuration.

6. The capacitor according to claim 1, wherein the movable charge plate comprises a solid surface plate and a broken surface suspension.

7. The capacitor according to claim 6 wherein the broken surface suspension has an undulating configuration.

8. A microelectromechanical structure variable capacitor comprising:
   a fixed charge plate disposed upon an elevated semiconductor substrate;
   a fixed actuator plate disposed upon a lower semiconductor substrate, wherein the fixed actuator plate is below the fixed charge plate;
   a moveable charge plate suspended above the fixed charge plate, wherein the fixed charge plate has a first surface area and the movable charge plate has a second surface area that is smaller than the fixed charge plate;
   a stiffener disposed upon a center portion of the moveable charge plate; and
   a movable actuator plate disposed over the fixed actuator plate.

9. The microelectromechanical structure variable capacitor according to claim 8, wherein the movable charge plate comprises a solid surface plate and a broken surface suspension.

10. The microelectromechanical structure variable capacitor according to claim 8, wherein the elevated substrate and the lower substrate have a negligible elevational difference.

* * * * *